United States Patent
Williams

(10) Patent No.: US 7,591,407 B2
(45) Date of Patent: Sep. 22, 2009

(54) ANCHOR AND METHOD FOR REDUCED CR (VI) (HEXAVALENT CHROMIUM) EXPOSURE IN A VESSEL

(75) Inventor: Michael G. Williams, Cleveland, TX (US)

(73) Assignee: ASI Industrial Services, LLC, Houston, TX (US)

( * ) Notice: Subject to any disclaimer, the term of this patent is extended or adjusted under 35 U.S.C. 154(b) by 0 days.

(21) Appl. No.: 11/778,501

(22) Filed: Jul. 16, 2007

(65) Prior Publication Data

US 2008/0020223 A1    Jan. 24, 2008

Related U.S. Application Data

(60) Provisional application No. 60/807,691, filed on Jul. 18, 2006.

(51) Int. Cl.
*A47J 36/02* (2006.01)
*B23K 20/22* (2006.01)

(52) U.S. Cl. .................. 228/101; 228/262.41

(58) Field of Classification Search ........... None
See application file for complete search history.

(56) References Cited

U.S. PATENT DOCUMENTS

| | | | | |
|---|---|---|---|---|
| 3,085,148 A | * | 4/1963 | McConnell | 219/139 |
| 3,336,712 A | * | 8/1967 | Bartley | 52/378 |
| 3,352,429 A | * | 11/1967 | Magnuson | 211/113 |
| 4,292,911 A | * | 10/1981 | Lindsay | 114/218 |
| 4,660,343 A | * | 4/1987 | Raycher et al. | 52/378 |
| 4,842,912 A | * | 6/1989 | Hutter, III | 428/66.6 |
| 4,959,518 A | * | 9/1990 | Reynolds, Jr. | 219/99 |
| 5,169,116 A | * | 12/1992 | Bergetz | 248/680 |
| 5,618,491 A | * | 4/1997 | Kurup et al. | 420/77 |
| 5,967,344 A | * | 10/1999 | Liberati | 211/87.01 |
| 6,034,345 A | * | 3/2000 | Firestone | 219/98 |
| 6,393,789 B1 | | 5/2002 | Lanclos | |
| 7,227,096 B2 | * | 6/2007 | Barton | 219/98 |

OTHER PUBLICATIONS

Welding Handbook, 1991, AWS, Ed. 8th, vol. 1, p. 529-534.*
Blodgett, Design of Welded Structures, 1966, The James F. Lincoln Arc Welding Foundation, p. 1.1-7-8.*

* cited by examiner

*Primary Examiner*—Kiley Stoner
*Assistant Examiner*—Carlos Gamino
(74) *Attorney, Agent, or Firm*—Kenneth A. Keeling; Melissa M. Martinez; Keeling Patent & Trademarks, LLC

(57) ABSTRACT

An anchor for use interior of a carbon steel vessel, the anchor comprising a carbon steel anchor element and a carbon steel base, the anchor allowing welding of the base to the wall of the vessel without release of hexavalent chromium during installation. A method for installing a stainless steel anchor element to the interior wall of a carbon steel vessel, comprising welding the stainless steel anchor element to a carbon steel base in a ventilated environment exterior of the vessel interior and subsequently welding the carbon steel base to the vessel wall interior of the vessel.

5 Claims, 1 Drawing Sheet

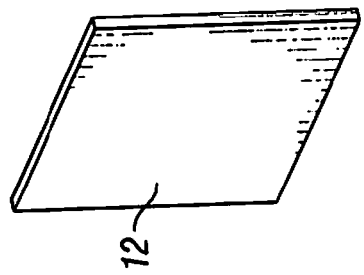
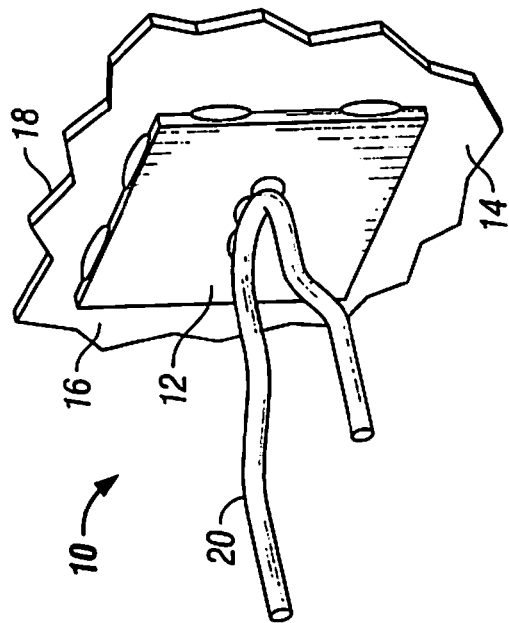
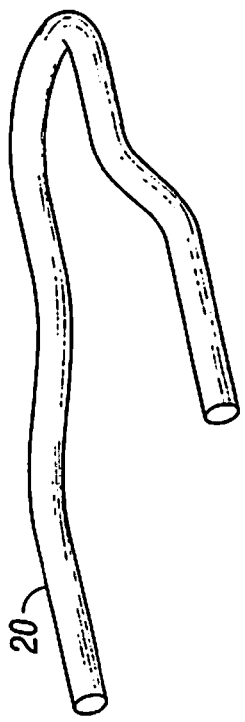
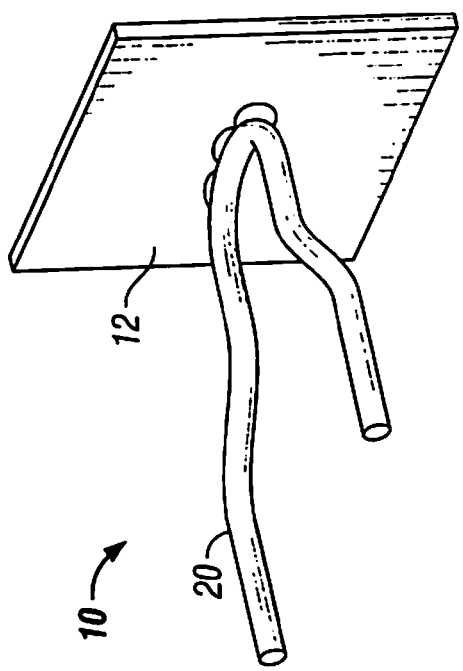

ANCHOR AND METHOD FOR REDUCED CR (VI) (HEXAVALENT CHROMIUM) EXPOSURE IN A VESSEL

CROSS-REFERENCE TO RELATED APPLICATIONS

This application claims the benefit of U.S. Provisional application Ser. No. 60/807,691, entitled "Reduced Cr (VI) (Hexavalent Chromium) Exposure Technique," filed Jul. 18, 2006.

STATEMENT REGARDING FEDERALLY SPONSORED RESEARCH OR DEVELOPMENT

Not Applicable.

BACKGROUND OF THE INVENTION

1. Field of the Invention

The present invention relates generally to large metallic vessel construction and modification, and, more specifically, to an anchor for use interior of a vessel and a method for installing stainless steel components in vessels without releasing hexavalent chromium in the vessels.

2. Description of the Related Art

In February 2006, the U.S. Department of Labor's Occupational Safety and Health Administration (O.S.H.A.) published its new standard for occupational exposure to hexavalent chromium. Hexavalent chromium, also known as chromium (VI) or Cr (VI), is a natural metal used in a wide variety of industrial activities, including the manufacture of stainless steel, welding, painting and pigment application, electroplating, and other surface coating processes. O.S.H.A. determined that the new standard is necessary to reduce significant health risks posed by occupational exposure to chromium (VI).

The standard covers the general industry, construction, and shipyards sectors and will protect workers against exposure to hexavalent chromium, while providing employers with adequate time to transition to the new requirements.

Large metallic vessels, such as high temperature chemical processing tanks, are often constructed with a large number of spaced metallic anchors attached to their interior surfaces. These anchors are typically used for anchoring refractory materials to the interior walls of the vessel for protecting the vessel from damage from the high temperature chemical processes occurring therein. The anchors are typically made of stainless steel. The vessel walls are typically constructed of carbon steel.

According to known methods of the prior art, the anchors are installed in the vessels by ironworkers by spot or stud welding. The ironworkers must generally enter the vessels to accomplish the welding work. The process of welding the grades of steel of which the anchors are generally made to carbon steel generates airborne hexavalent chromium. Hexavalent chromium has been determined to create a health hazard when released into a confined space so that it contaminates the breathing air. To avoid this health hazard, workers have heretofore generally worn HEPA-type half-mask filters over their mouth and nose.

The new O.S.H.A. standards require greater worker protection than is provided by the half-mask filters previously used. The new standards require that workers exposed to hexavalent chromium wear full-mask respirators having oxygen provided to the workers from an external source. The standards also require that a worker exposed to hexavalent chromium inside a closed vessel be harnessed and tethered to a worker outside the vessel, so that he can be quickly removed from the vessel in the event of loss of consciousness. The new O.S.H.A. standards are much more burdensome on both employers and their ironworkers than the prior standards were. The full mask respirators and oxygen supply and related equipment are quite expensive. In addition, ironworkers generally find it more cumbersome and difficult to work while wearing full-mask respirators attached to oxygen supply hoses.

A need therefore exists for a method for installing anchors or other components comprising stainless steel in metallic vessels without requiring the ironworkers to comply with the new, more stringent O.S.H.A. standards or an anchor that provides the benefits of stainless steel without the corresponding problem associated with welding the stainless steel to the interior of a carbon steel vessel. Preferably, the method will permit the components to be installed without releasing hexavalent chromium into the vessels.

BRIEF SUMMARY OF THE INVENTION

The present invention addresses the aforementioned need. According to one embodiment of the invention, there is provided an anchor for use that may be welded to the interior of a vessel comprising carbon steel without generating hexavalent chromium.

The present invention further comprises a method for preventing the release of airborne hexavalent chromium when installing anchors comprising stainless steel onto the interior surface of a vessel comprising carbon steel. The method comprises first welding the anchors to carbon steel bases outside the vessel in a well-ventilated workplace where the workers are not required to wear respirators. The anchors attached to the carbon steel bases are then brought into the vessels, where the carbon steel bases are welded to the interior surface of the vessel. Because the stainless steel anchors are not welded inside the vessels, no hexavalent chromium is released in the vessels, and the ironworkers who install the anchors do not require respirators for exposure to hexavalent chromium.

Accordingly, it is an object of the present invention to provide a method for preventing the release of hexavalent chromium when installing components comprising stainless steel onto the interior surface of metallic vessels.

Other objects of the invention are apparent from the following description, the claims set forth below, and the accompanying drawings.

BRIEF DESCRIPTION OF THE DRAWINGS

For a more complete understanding of the present invention and the advantages thereof, reference is now made to the following Detailed Description of an Example Embodiment of the Invention, taken in conjunction with the accompanying drawings, in which:

FIG. 1 is a perspective view of an anchor comprising stainless steel.

FIG. 2 is a perspective view of a carbon steel base utilized in the method of the present invention.

FIG. 3 is a perspective view of the anchor of FIG. 1 attached to the carbon steel base of FIG. 2 by welding.

FIG. 4 is a perspective view of the anchor and base of FIG. 3, wherein the base is welded to the interior wall of a steel vessel.

DESCRIPTION OF AN EXAMPLE EMBODIMENT OF THE INVENTION

The invention and its advantages are best understood by referring to the drawings, like numerals being used for like and corresponding parts of the various drawings. In FIGS. 1-4 there is illustrated an anchor 10 of the present invention for preventing the release of hexavalent chromium vapor when installing stainless steel anchor element 20 onto the interior surface 16 of wall 14 of a vessel 18 (segment shown in FIG. 4) comprising carbon steel.

FIG. 1 illustrates an anchor element 20 comprising stainless steel. In practice, anchor element 20 may be used to anchor refractory materials to the interior surface 16 of a vessel 18, whether for original installation or replacement. Anchor element 20 may be of a configuration as illustrated in FIG. 1 or may be of a different configuration.

In prior art installations, the anchor elements 20 are welded directly to interior surface 16 of vessel 18. As element 20 is constructed of stainless steel and vessel 18 is constructed of carbon steel, such welding operation generates, among other by-products, a level of hexavalent chromium that is not desirable, particularly within the confines of an industrial vessel.

FIG. 2 illustrates a carbon steel base 12. In the present invention steel base 12 is attached to anchor element 20 remotely from the interior of vessel 12. More particularly, the anchor element 20 is welded to the carbon steel base 12 in a well-ventilated area wherein the welding by-products, including hexavalent chromium, may be directed away from the welding operation. Alternatively, such welding may be accomplished by remotely-operable welding machines that allow the operator to be physically removed from the welding operation.

FIG. 3 illustrates an anchor assembly comprising an anchor element 20 welded to a base 12. Anchor 10 may be fixedly attached to interior surface 16 of vessel 18 by conventional welding methods involving the welding of one carbon steel element to another carbon steel element. As illustrated in FIG. 4, such welding process involves the welding of carbon steel base 12 to carbon steel vessel interior surface 16. Accordingly, such welding is achieved without concern for generation of significant hexavalent chromium vapor, thereby eliminating the need of specialty equipment to protect the installer from hexavalent chromium exposure. Conventional electric arc welding may be used for welding the bases 12 to the vessel wall.

In an alternative illustrative embodiment of the invention (not shown), wherein the wall 14 of vessel 18 is curved at an installation location, base 12 is curved to conform to the curvature of the vessel wall.

In various embodiments of the invention, the carbon steel bases 12 are attached to the vessel surface in either a staggered pattern or in a non-staggered pattern, depending on the specific application for the anchors.

In various embodiments of the invention, the carbon steel bases 12 are square, triangular, round, or rectangular in shape. Where the bases 12 are non-circular, the corners of the bases may be rounded to facilitate the welding.

The method of the present invention comprises a method of installing stainless steel anchor elements in the interior of an industrial vessel comprising the following steps:

An element-to-base welding step comprising welding a stainless steel anchor element 20 to a carbon steel base 12 exterior of the vessel.

A base-to-vessel welding step comprising welding the carbon steel base 12 to the interior surface 16 of vessel wall 14 using conventional welding methods.

The vessel anchor and method of the present invention for preventing the release of airborne hexavalent chromium, and many of its intended advantages, will be understood from the foregoing description of an example embodiment, and it will be apparent that, although the invention and its advantages have been described in detail, various changes, substitutions, and alterations may be made in the manner, procedure, and details thereof without departing from the spirit and scope of the invention, as defined by the appended claims, or sacrificing any of its material advantages, the forms hereinbefore described being merely an exemplary embodiment thereof.

What is claimed is:

1. A method for preventing worker exposure to hexavalent chromium vapor when installing a stainless steel anchor element onto the interior surface of a vessel comprising carbon steel, the method comprising:
    an element-to-base welding step comprising welding said stainless steel anchor element to a carbon steel base;
    a base-to-vessel welding step comprising welding said carbon steel base to said interior surface of said carbon steel vessel wall;
    wherein said element-to-base welding step is conducted exterior of said vessel.

2. The method of claim 1, wherein said element-to-base welding step is conducted remotely from said vessel.

3. The method of claim 2, wherein the wall of the vessel is curved, and wherein the carbon steel base is curved to conform to the curvature of the vessel wall.

4. A method for preventing a worker from being exposed to hexavalent chromium vapor when installing a stainless steel anchor element onto the interior surface of a vessel, the method comprising
    a first welding step wherein said stainless steel anchor element is welded to a carbon steel base at a location exterior of said vessel;
    a second welding step wherein said carbon steel base is welded to said interior surface of said vessel; and
    an anchoring step wherein a refractory material is anchored to said interior surface by attaching said refractory material to said stainless steel anchor element.

5. The method of claim 4 further comprising a rounding step wherein the corners of said carbon steel base are rounded.

* * * * *